(12) United States Patent
Kim et al.

(10) Patent No.: US 12,440,800 B2
(45) Date of Patent: Oct. 14, 2025

(54) SEPARATION AND RECOVERY SYSTEM AND METHOD OF HYDROGEN FROM COKE OVEN GAS(COG) IN STEEL INDUSTRY

(71) Applicant: KOREA RESEARCH INSTITUTE OF CHEMICAL TECHNOLOGY, Daejeon (KR)

(72) Inventors: Jeong Hoon Kim, Daejeon (KR); Bo Ryoung Park, Daejeon (KR); Ho Cheol Kang, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 491 days.

(21) Appl. No.: 17/972,127

(22) Filed: Oct. 24, 2022

(65) Prior Publication Data

US 2023/0132426 A1     May 4, 2023

(30) Foreign Application Priority Data

Oct. 29, 2021   (KR) .................. 10-2021-0146984

(51) Int. Cl.
| | | |
|---|---|---|
| *B01D 53/04* | (2006.01) | |
| *B01D 51/10* | (2006.01) | |
| *B01D 53/047* | (2006.01) | |
| *B01D 53/22* | (2006.01) | |
| *B01D 71/68* | (2006.01) | |

(52) U.S. Cl.
CPC ........... *B01D 53/229* (2013.01); *B01D 51/10* (2013.01); *B01D 53/0446* (2013.01); *B01D 53/0462* (2013.01); *B01D 53/047* (2013.01); *B01D 53/0476* (2013.01); *B01D 53/226* (2013.01); *B01D 71/68* (2013.01); *B01D 2253/102* (2013.01); *B01D 2253/108* (2013.01); *B01D 2253/116* (2013.01); *B01D 2253/25* (2013.01); *B01D 2256/16* (2013.01); *B01D 2257/102* (2013.01); *B01D 2257/304* (2013.01); *B01D 2257/502* (2013.01); *B01D 2257/504* (2013.01); *B01D 2257/7025* (2013.01); *B01D 2259/4146* (2013.01)

(58) Field of Classification Search
CPC .. B01D 53/229; B01D 53/10; B01D 53/0446; B01D 53/0462; B01D 53/047; B01D 53/0476; B01D 53/226
See application file for complete search history.

(56) References Cited

FOREIGN PATENT DOCUMENTS

| | | | | |
|---|---|---|---|---|
| CN | 106544062 A | * | 3/2017 | |
| CN | 111171848 A | * | 5/2020 | ............... C01B 3/34 |
| JP | 2005279361 A | * | 10/2005 | |
| KR | 102329389 B1 | | 11/2021 | |

* cited by examiner

*Primary Examiner* — Robert A Hopkins
(74) *Attorney, Agent, or Firm* — Fredrikson & Byron, P.A.

(57) ABSTRACT

The present invention relates to a system and method for separating and recovering hydrogen from coke oven gas (COG) in steel industry, particularly a system and method for separating and recovering hydrogen at a concentration of 99.9% by volume or more from coke oven gas (COG) in steel industry with a recovery rate of 95% or more.

10 Claims, 2 Drawing Sheets

SEPARATION AND RECOVERY SYSTEM AND METHOD OF HYDROGEN FROM COKE OVEN GAS(COG) IN STEEL INDUSTRY

CROSS-REFERENCE TO RELATED APPLICATIONS

This patent application claims the benefit of priority from Korean Patent Application No. 10-2021-0146984, filed on Oct. 29, 2021, the content of which is incorporated herein by reference.

BACKGROUND OF THE INVENTION

1. Field of the Invention

The present invention relates to a system and method for separating and recovering hydrogen at a concentration of 99.9% by volume or more from coke oven gas (COG) in steel industry with a recovery rate of 95% or more.

2. Description of the Related Art

When hydrogen reacts with oxygen in the air and burns, only water is discharged and does not cause pollution, so it is a gas that can be used as a clean fuel. Currently, it is mainly used as a raw material for manufacturing intermediate substances and products in chemical industry, but its use as a fuel for fuel cells is still insignificant. However, as the development of hydrogen fuel cell technology, related industries are being reorganized to gradually replace the existing fossil fuel with hydrogen as a fuel for fuel cells for clean power generation and transportation means such as vehicles and ships. Accordingly, the development of hydrogen production, separation, purification and application technology became important.

Hydrogen is generally produced by reforming hydrocarbons such as natural gas into steam, or by partially oxidizing hydrocarbon-containing materials such as fossil fuels and biomaterials with oxygen to make synthesis gas, and then separating and recovering the gas. In addition to the hydrogen produced directly in this way, there is by-product hydrogen that is produced as a by-product in oil refining and chemical industries as hydrogen that can be utilized. Naphtha cracking and numerous dehydrogenation processes in petrochemical industry, and manufacturing processes in acid/alkali industry are representative processes that produce by-product hydrogen. Hydrogen and by-product hydrogen produced through chemical reactions are currently consumed as raw materials for manufacturing intermediates and final products in chemical industry, and only a small part of them is distributed in the market. Distribution quantity of hydrogen is far short for use in fuel cells, and more than 99.99% purity is required for fuel cells, so a new manufacturing method and a separation & purification technology, which are different from the existing method, are needed to produce high-purity hydrogen in a large amount and at a low price. Based on the supply price of a hydrogen station, the hydrogen price is currently about 570 won/Nm$^3$, but is expected to fall below 400 won/Nm$^3$ and ultimately below 300 won/Nm$^3$ in accordance with the government policy to revitalize the hydrogen economy. One of the best ways to mass-produce high-purity hydrogen at this price is to separate and recover hydrogen contained in coke oven gas (COG) by-produced in a steel mill at high-purity.

Coke oven gas (COG) is a gas produced in a process of manufacturing coke used as a reducing agent in a steelmaking process, and more than 100 million tons are by-produced worldwide annually, 400,000 to 500,000 tons are produced in Korea as well, and this coke oven gas (COG) contains about 56% of hydrogen. Therefore, if hydrogen can be recovered with high purity and high recovery rate from this, the hydrogen demand for fuel cells can be theoretically covered up to 50%.

On the other hand, coke oven gas (COG) is a mixed gas with a complex composition containing carbon monoxide (CO), nitrogen ($N_2$), carbon dioxide ($CO_2$), methane ($CH_4$), and more than $C_2$ hydrocarbon gas ($C_nH_{2n}$) in addition to hydrogen. In addition, a small amount of impurities such as tar, oil, hydrogen sulfide ($H_2S$) and dust are included in this gas, so a separation and purification technology that can recover more than 99.99% of high-purity hydrogen from this coke oven gas (COG) at low cost is required. However, due to the absence of this technology, most of coke oven gas (COG) is currently burned as a power generation fuel for electric power production. In addition, there is a problem in that uncollected impurities that cause air pollution are burned and released into the atmosphere during this process. Therefore, a low-energy, high-efficiency separation and recovery process is needed to recover hydrogen cheaply from multi-component COG mixed gas, and if this technology is developed, it can be used as a fuel for fuel cells for transportation and power generation and as a chemical raw material gas for chemical industry.

As a conventional technique for separating and purifying hydrogen from coke oven gas (COG), a traditional low-temperature distillation method, a pressure swing adsorption (PSA), an absorption method, and a membrane separation method can be applied.

However, in the case of using low-temperature distillation, coke oven gas (COG) has a concentration of 56.4% of hydrogen with a very low liquefaction temperature, and contains carbon monoxide, carbon dioxide, carbon dioxide and light hydrocarbon gas with various liquefaction temperatures. Therefore, the low-temperature distillation process consumes a lot of energy and the purchase and construction costs of the plant required for low-temperature distillation are high, so there is no example of a commercial plant being operated so far.

In addition, in the case of using the pressure swing adsorption (PSA), it has been stated that the recovery rate drops below 60% when hydrogen is purified to 99-99.99% purity by applying a 2-bed (2-layer) adsorption tower in a Japanese literature on the pressure swing adsorption (PEA) method of recovering hydrogen from coke oven gas (COG) using zeolite 5A as an adsorbent (Journal of the Fuel Society of Japan, vol. 62, is. 12, pp 989-994, 1983). Recently, the pressure swing adsorption (PSA) has been applied to the steel by-product gas refining process in the United States, Europe, Japan, China and Korea, and has been installed and operated as a small-scale pilot plant. In this pressure swing adsorption method (PEA), impurities such as tar, hydrogen sulfide, and dust contained in the by-product gas are removed through pretreatment, and then the purity of hydrogen is increased to 90% in a 4-bed adsorption tower under a high pressure between 10 and 20 atm, and then a two-stage 4-bed PSA process is operated to increase the purity to 99.99% by repurifying hydrogen in a connected 4-bed adsorption tower, and it is known that the final hydrogen recovery rate is very low as about 60%. In addition, this PSA process is difficult to operate precisely because it uses adsorbents of various characteristics to adsorb and desorb carbon monoxide (CO), carbon dioxide ($CO_2$), nitrogen ($N_2$) and methane gas ($CH_4$) excluding hydrogen, and the number and size of the adsorption tower must be increased in the process of gas recirculation to increase the low hydrogen recovery rate of 60%. Therefore, it is not economical to produce hydrogen on a large scale, so there is still a need for technology improvement.

On the other hand, in a recent foreign paper that comparatively analyzed the advantages and disadvantages of pressure swing adsorption (PSA) and membrane separation methods for commercial hydrogen separation and purification processes, it is reported that the purity of hydrogen separated by the membrane separation method is somewhat lower than that of hydrogen separated by pressure swing adsorption (PSA), but the membrane separation method has a high recovery rate, low capital cost, low energy cost and low production cost, resulting in high economic efficiency.

In order to solve this problem, the present inventors separated hydrogen from coke oven gas (COG) at a high concentration by using a membrane separation process as a mixed process of a pressure swing adsorption (PSA) and a membrane separation process in Application No. 10-2020-0166696. Thereafter, the present inventors have disclosed a membrane separation-PSA hybrid process capable of recovering high-purity hydrogen at a high recovery rate by removing trace impurities through the pressure swing adsorption (PSA). In the present invention, a system and method for separating and recovering hydrogen have been developed using a multi-stage membrane separation process that uses a hybrid process of a membrane separation process and a pressure swing adsorption (PSA) but is connected and recirculated in series or series-parallel using one compressor. The present inventors have completed the present invention through the above process.

SUMMARY OF THE INVENTION

It is an object of the present invention to provide a system and method for separating and recovering hydrogen from coke oven gas (COG) in steel industry.

To achieve the above object, in one aspect of the present invention, the present invention provides a system for separating and recovering hydrogen at a concentration of 99.9% by volume or more from coke oven gas (COG) in steel industry with a recovery rate of 95% or more, comprising the following units:
  a preprocessing unit for removing impurities including tar, moisture, oil, hydrogen sulfide and dust from coke oven gas (COG) containing hydrogen, methane, carbon monoxide, carbon dioxide, nitrogen, light hydrocarbons and impurities such as tar, moisture, oil, hydrogen sulfide and dust;
  a membrane separation unit comprising a plurality of separation membrane packages in which at least two separation membrane packages that selectively permeate hydrogen are connected in series, and a single compressor connected to the separation membrane package that produces a hydrogen-enriched gas stream at a concentration of at least 95 volume % by recovering hydrogen from the coke oven gas (COG) with a recovery rate of 90% or more through membrane separation of the coke oven gas (COG) treated in the preprocessing unit; and
  a first adsorption unit for separating and recovering hydrogen from the coke oven gas (COG) by contacting the hydrogen-enriched gas stream with a first adsorbent.

In this case, the gas stream discharged from the first adsorption unit can have a circulation structure supplied to a front end of the compressor.

The membrane separation unit can have a circulation structure for re-supplying the gas stream discharged from a residual outlet of the separation membrane package located at a rear end of the separation membrane package to a residual inlet of the separation membrane package located at a front end.

The compressor can compress the gas stream delivered to the separation membrane package to 5 bar to 15 bar.

The separation membrane package can comprise a polymer separation membrane for selectively separating hydrogen from a mixed gas including hydrogen, carbon monoxide, carbon dioxide, nitrogen, methane and light hydrocarbon gas.

In this case, the polymer separation membrane can be composed of at least one selected from the group consisting of polysulfone, polyimide and polybenzimidazole.

The first adsorption unit is operated by a pressure swing adsorption (PSA) method using an adsorption tower, in which the first adsorbent is filled in a single layer or multiple layers, The first adsorbent can be at least one selected from the group consisting of carbon molecular sieve activated carbon (CMS 5A), Ag-doped impregnated activated carbon, zeolite 13X, zeolite 5A, CuCl and Lix-doped zeolite LiX.

The system for separating and recovering hydrogen from coke oven gas (COG) in steel industry can further comprise a second adsorption unit operated by a thermal swing adsorption (TSA) method or a vapor pressure swing adsorption (VPSA) method at a rear end of the first adsorption unit operated by a pressure swing adsorption (PSA) method.

In another aspect of the present invention, the present invention provides a method for separating and recovering hydrogen at a concentration of 99.9% by volume or more from coke oven gas (COG) in steel industry with a recovery rate of 95% or more, comprising the following steps:
  a step of preprocessing to remove impurities including tar, moisture, oil, hydrogen sulfide and dust from coke oven gas (COG) containing hydrogen, methane, carbon monoxide, carbon dioxide, nitrogen, light hydrocarbons and impurities such as tar, moisture, oil, hydrogen sulfide and dust;
  a step of membrane separation to produce a hydrogen-enriched gas stream at a concentration of at least 95 volume % by recovering hydrogen from the coke oven gas (COG) with a recovery rate of 90% or more through membrane separation of the coke oven gas (COG) treated in the preprocessing unit in the membrane separation unit comprising a plurality of separation membrane packages in which at least two separation membrane packages that selectively permeate hydrogen are connected in series, and a single compressor connected to the separation membrane package; and
  a step of first adsorption to separate and recover hydrogen from the coke oven gas (COG) by contacting the hydrogen-enriched gas stream with a first adsorbent.

In another aspect of the present invention, the present invention provides a method for concentrating hydrogen from coke oven gas (COG) in steel industry that separates and recovers hydrogen at a concentration of 99.9% by volume or more with a recovery rate of 95% or more, comprising the following steps:
  a step of preprocessing to remove impurities including tar, moisture, oil, hydrogen sulfide and dust from coke oven gas (COG) containing hydrogen, methane, carbon monoxide, carbon dioxide, nitrogen, light hydrocarbons and impurities such as tar, moisture, oil, hydrogen sulfide and dust;

a step of membrane separation to produce a hydrogen-enriched gas stream at a concentration of at least 95 volume % by recovering hydrogen from the coke oven gas (COG) with a recovery rate of 90% or more through membrane separation of the coke oven gas (COG) treated in the preprocessing unit in the membrane separation unit comprising a plurality of separation membrane packages in which at least two separation membrane packages that selectively permeate hydrogen are connected in series, and a single compressor connected to the separation membrane package; and a step of first adsorption to separate and recover hydrogen from the coke oven gas (COG) by contacting the hydrogen-enriched gas stream with a first adsorbent.

Advantageous Effect

The system and method for separating and recovering hydrogen from coke oven gas (COG) in steel industry of the present invention have an advantage of recovering hydrogen with a purity of 99.99% or more that can be used as a high value-added fuel cell fuel and chemical raw material from coke oven gas (COG) at a low energy cost with a high yield of 90% or more.

Typically, when two or more compressors are used in the membrane separation process, the total cost of the compressor accounts for more than 40 to 50% of the total plant cost, so the price of the compressor is very important in the economic feasibility of the membrane separation process. In the present invention, it is possible to significantly reduce the overall plant cost by separating and recovering high-purity hydrogen only by using one compressor, that is, a single compressor, and it is possible to significantly increase the entire process operation and separation efficiency by reducing the energy cost of the compression process.

Accordingly, it is possible to generate a large amount of high-purity hydrogen using coke oven gas (COG) by-produced more than 100 million tons per year worldwide and produced 400,000-500,000 tons in Korea, and possible to use thereof as a raw material for fuel cell fuel and chemical industry.

DESCRIPTION OF THE PREFERRED EMBODIMENTS

Figure 1:
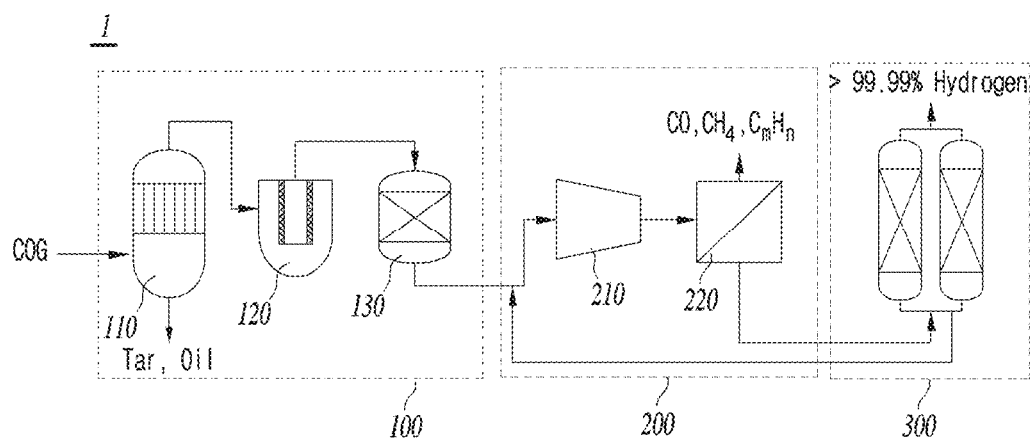
FIG. 1 is a process flow diagram of a system for separating and recovering hydrogen from coke oven gas (COG) in steel industry according to one aspect of the present invention.

Hereinafter, the preferable embodiments of the present invention are described with the attached drawings. However, the embodiments of the present invention can be modified and altered in various ways and the present invention is not limited to the following illustration. It is well understood by those in the art who has the average knowledge on this field that the embodiments of the present invention are given to explain the present invention more precisely. Therefore, the shape and size of the elements in the drawings may be exaggerated for clarity of illustration and the elements indicated by the same mark in the drawings are the same elements. The factors showing similar function or activity are also indicated by the same mark in all the drawings. In addition, the "inclusion" of an element throughout the specification does not exclude other elements, but may include other elements, unless specifically stated otherwise.

In one aspect of the present invention, the present invention provides a system for separating and recovering hydrogen from coke oven gas (COG) in steel industry, comprising the following units:

a preprocessing unit for removing impurities including tar, moisture, oil, hydrogen sulfide and dust from coke oven gas (COG);

a membrane separation unit comprising a polymer separation membrane module that produces a hydrogen-enriched gas stream through membrane separation of the coke oven gas (COG) treated in the preprocessing unit; and a first adsorption unit for separating and recovering hydrogen by contacting the hydrogen-enriched gas stream with a first adsorbent.

More particularly, in one aspect of the present invention, the present invention provides a system for separating and recovering hydrogen at a concentration of 99.9% by volume or more from coke oven gas (COG) in steel industry with a recovery rate of 95% or more, comprising the following units:

a preprocessing unit for removing impurities including tar, moisture, oil, hydrogen sulfide and dust from coke oven gas (COG) containing hydrogen, methane, carbon monoxide, carbon dioxide, nitrogen, light hydrocarbons and impurities such as tar, moisture, oil, hydrogen sulfide and dust;

a membrane separation unit comprising a plurality of separation membrane packages in which at least two separation membrane packages that selectively permeate hydrogen are connected in series, and a single compressor connected to the separation membrane package that produces a hydrogen-enriched gas stream at a concentration of at least 95 volume % by recovering hydrogen from the coke oven gas (COG) with a recovery rate of 90% or more through membrane separation of the coke oven gas (COG) treated in the preprocessing unit; and a first adsorption unit for separating and recovering hydrogen from the coke oven gas (COG) by contacting the hydrogen-enriched gas stream with a first adsorbent.

Hereinafter, a system for separating and recovering hydrogen from coke oven gas (COG) in steel industry according to one aspect of the present invention will be described in detail with reference to the attached drawings.

FIG. 1 is a process flow diagram of a system for separating and recovering hydrogen from coke oven gas (COG) in steel industry according to one aspect of the present invention.

The system for separating and recovering hydrogen from coke oven gas (COG) in steel industry according to one aspect of the present invention can separate and recover hydrogen from the coke oven gas (COG) generated in steel industry at a high yield of 90% or more, while recovering hydrogen at a high purity of 99% or more, preferably 99.9% or more, more preferably 99.99% or more.

Referring to FIG. 1, the system (1) comprises a preprocessing unit (100) that removes impurities such as tar, oil, moisture, hydrogen sulfide and dust contained in coke oven gas (COG).

The preprocessing unit (100) may comprise at least one of a condensing device (110), a filtering device (120), and a desulfurization, device (130), and preferably can comprise all of them.

The condensing device (110) is a device for removing moisture, oil, and tar in a droplet state contained in coke oven gas (COG), and for this purpose, the coke oven gas (COG) by-produced in a steel mill may be introduced into the condensing device (110) of the preprocessing unit (100) after the flow rate is adjusted.

The condensing device (110) can be in the form of a shell & tube heat exchanger, but is not limited thereto, and various forms for removing moisture, oil, and tar in a droplet state can be used.

The condensing device (110) can cool the coke oven gas (COG) with a refrigerant having a temperature between 0° C. and 20° C. in order to effectively liquefy moisture, oil, and tar to discharge to the lower part of the device.

The filtering device (120) can be a device for removing dust contained in coke oven gas (COG). If the dust contained in the coke oven gas (COG) is not removed and flows into the desulfurization device (130), the membrane separation unit (200) and the first adsorption unit (300), the device and the pipe may be clogged, which can cause a problem in that the operation is stopped. Accordingly, when the preprocessing unit (100) includes the filtering device (120) and the desulfurization device (130), the filtering device (120) may be preferably disposed at a front end of the desulfurization device (130).

As the filtering device (120), a bag filter, a cartridge type filter, or an electric dust collector can be used to collect and remove residual dust contained in coke oven gas (COG), that is, remaining particulate materials.

The desulfurization device (130) can be a device for removing hydrogen sulfide contained in coke oven gas (COG).

Hydrogen sulfide contained in coke oven gas (COG) is derived from coal and is produced when coal is dry-distillated to produce coke and remains in coke oven gas (COG). If even a small amount of hydrogen sulfide is present in hydrogen, the lifespan of a fuel cell is shortened and the efficiency of the fuel cell is reduced, so it should be thoroughly removed.

For the desulfurization device (130), a wet method for removing hydrogen sulfide by absorbing it in a highly soluble solvent such as amine, or a dry method for removing hydrogen sulfide by adsorbing it to a first adsorbent can be used, but preferably a dry method having excellent hydrogen sulfide removal effect can be used. As the first adsorbent used at this time, a first adsorbent in which iron oxide ($Fe_2O_3$) or zinc oxide (ZnO) is supported on various supports such as zeolite, activated carbon and wood chips can be used.

The desulfurization device (130) may be an adsorption tower, in which the first adsorbent is disposed, and can remove hydrogen sulfide contained in coke oven gas (COG) through a repeated cycle process of adsorption and desorption of the adsorption tower.

Meanwhile, the system (1) comprises a membrane separation unit (200).

The membrane separation unit (200) includes a polymer separation membrane module, and can generate a hydrogen-enriched gas stream by membrane separation of the coke oven gas (COG) treated in the preprocessing unit.

More particularly, the membrane separation unit (200) comprises a plurality of separation membrane packages in which at least two separation membrane packages that selectively permeate hydrogen are connected in series, and a single compressor connected to the separation membrane package, and can produce a hydrogen-enriched gas stream at a concentration of at least 95 volume % by recovering hydrogen from the coke oven gas (COG) with a recovery rate of 90% or more through membrane separation of the coke oven gas (COG) treated in the preprocessing unit The membrane separation unit (200) can produce a hydrogen-enriched gas stream from the coke oven gas (COG) from which tar, moisture, oil, hydrogen sulfide and dust have been removed by being treated in the preprocessing unit (100), preferably can produce a hydrogen-enriched gas stream comprising at least about 95%, more preferably at least 99% hydrogen by volume from the coke oven gas (COG) comprising 50% to 60% hydrogen by volume.

The membrane separation unit (200) includes a polymer separation membrane module (210), and can be a device for concentrating hydrogen by a membrane separation method that separates hydrogen by a pressure difference between a residual side and a permeation side of the polymer separation membrane module (210).

The polymer separation membrane module (220) can be configured as a polymer separation membrane for separating hydrogen from the coke oven gas (COG) processed in the preprocessing unit.

The polymer separation membrane module (220) can include a polymer separation membrane that selectively permeates hydrogen or selectively retains hydrogen from a mixed gas containing carbon monoxide, carbon dioxide, nitrogen, methane and light hydrocarbon gas, but can preferably include a polymer separation membrane that selectively permeates hydrogen in consideration of ease of use and effectiveness of hydrogen separation.

Herein, the light hydrocarbon can be $C_2$ or higher hydrocarbon, preferably $C_2$~$C_4$ hydrocarbon.

Accordingly, the polymer separation membrane is a separation membrane having excellent hydrogen selectivity, and can be at least one selected from the group consisting of polysulfone, polyimide, and polybenzimidazole.

The polysulfone, polyimide and polybenzimidazole-based polymer separation membrane has a hydrogen selectivity of 20 or more, preferably 20 to 200, and removes carbon monoxide, nitrogen, methane and light hydrocarbons excluding carbon dioxide from coke oven gas (COG) to effectively permeate and separate hydrogen.

In addition, the polysulfone, polyimide and polybenzimidazole-based polymer separation membrane is a glassy polymer membrane, and as the temperature increases, the solubility of $CO_2$ decreases whereas the dispersion coefficient of hydrogen having a small molecular size increases, thereby increasing the selectivity.

Accordingly, by using the polysulfone, polyimide and polybenzimidazole-based polymer separation membrane in the membrane separation unit (200), and maintaining the temperature of the gas stream delivered to the polymer separation membrane module (220) preferably at 0° C. to 100° C., more preferably 20° C. to 50° C., hydrogen can be permeated and separated more effectively.

The polymer separation membrane module (220) can be in the form of a hollow fiber type, a spiral wound type, and a flat type, but is not limited thereto, and other separation membrane types can be applied.

The hydrogen permeability of the polymer separation membrane module (220) can be 50 GPU or more, preferably 50 to 500 GPU, and more preferably 100 to 300 GPU. If the hydrogen permeability of the polymer separation membrane module 1220) is less than 50 GPU, the membrane area required for recovering hydrogen at a high recovery rate increases, and thus economic efficiency may be significantly reduced.

The carbon dioxide permeability of the polymer separation membrane module (200) can be 50 to 90 GPU, and the permeability of carbon monoxide, nitrogen, methane, and light gas can be 1 to 10 GPU.

In addition, the hydrogen selectivity to carbon monoxide, methane, and nitrogen of the polymer separation membrane can be 10 to 200, preferably 20 to 100. If the hydrogen selectivity to carbon monoxide, methane, and nitrogen is less than 10, more compressors may be required to recover hydrogen at a high concentration, and also, as the flow rate of gas recirculated to the compressor increases, the cost of gas compression is high, which may cause a problem in that economic costs increase. In addition, if the hydrogen selectivity to carbon monoxide, methane and nitrogen exceeds 200, the hydrogen concentration from the gas inlet to the permeation side of the separation membrane reaches 100%, and there is no partial pressure difference, so the separation driving force is weakened and a large-scale membrane area may be required, which may significantly reduce economic efficiency.

The hydrogen selectivity to carbon dioxide of the polymer separation membrane can be 2 to 13.

Meanwhile, the membrane separation unit (200) can be in the form of a multi-stage separation membrane package comprising a plurality of separation membrane packages including at least one polymer separation membrane module, in which at least two separation membrane packages are connected in series.

Herein, the separation membrane package (221) means a separation membrane module bundle including a plurality of separation membrane modules (220), and more preferably, a separation membrane module bundle in which a plurality of polymer separation membrane modules are connected in parallel.

On the other hand, the membrane separation unit (200) is characterized in that it includes a single compressor, that is, one compressor.

The compressor (210) can be located at a front end of the separation membrane package disposed at a frontmost end among the plurality of separation membrane packages, that is, between the preprocessing unit and the frontmost separation membrane package.

The compressor (210) can increase the membrane separation efficiency by increasing the pressure of the gas stream flowing into the frontmost separation membrane package.

The compressor (210) can compress the pressure of the gas stream to 5 bar to 15 bar based on absolute pressure, more preferably 8 bar to 12 bar, and thus the pressure of the gas stream flowing into the polymer membrane module (220), that is, the residual side pressure, can be 5 bar to 15 bar based on absolute pressure, more preferably 8 bar to 12 bar, and the pressure of the gas stream passing through the polymer membrane module (210), that is, the permeation side pressure, can be an atmospheric pressure of 0.001 bar to 1.2 bar or a vacuum state.

In the system for separating and recovering hydrogen from coke oven gas (COG) in steel industry according to one aspect of the present invention, the recovery rate of hydrogen separated and recovered from coke oven gas (COG) can be increased to 90% or more, preferably 95% or more, and the purity of hydrogen to 95% or more, preferably 99% or more by significantly lower plant cost and easy process operation due to the single compressor and multi-stage membrane package structure of the membrane separation unit (200).

In this case, the multi-stage separation membrane package structure can be a two-stage separation membrane package structure in which two separation membrane packages are connected in series, or can be a three-stage separation membrane package structure including two separation membrane packages connected in series, but is not limited thereto, and the multi stage separation membrane package structure can include various structures in which two or more separation membrane packages are connected in series and/or in parallel.

In addition, the membrane separation unit (200) can have a circulation structure in which the gas stream discharged from the residual outlet of the separation membrane package located at a rear end of the separation membrane package is resupplied to the residual inlet of the separation membrane package located at a frontmost end, preferably to a front end of the compressor (210).

Figure 2:
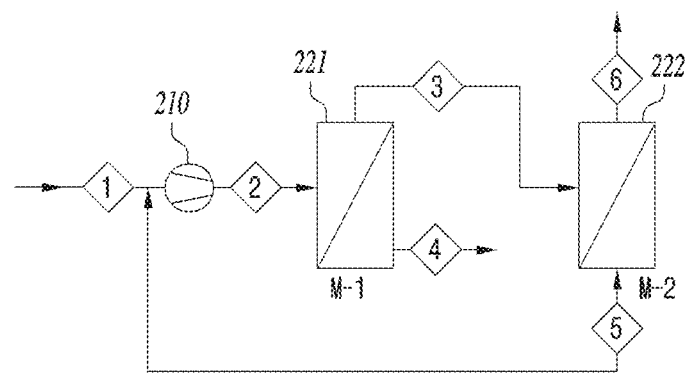
FIG. 2 is a process flow diagram of a two-stage membrane separation unit according to an embodiment of the present invention.

FIG. 2 is a process flow diagram of a membrane separation unit according to an embodiment of the present invention, showing a process flow diagram of a membrane separation unit consisting of one compressor and two separation membrane packages connected in series.

Referring to FIG. 2, the permeation side of the first separation membrane package (221) is connected to the second separation membrane package (222), and the permeation aide of the second separation membrane package (222) is connected to the first adsorption unit (300) to supply a hydrogen-enriched gas stream to the first adsorption unit (300), and the residual side of the second separation membrane package (222) can be connected to a front end of the compressor (210) to have a circulation structure in which the residual gas stream of the second separation membrane package (222) is re-supplied to the first separation membrane package. In this case, the compressor (210) can be located only at a front end of the first separation membrane package (221).

The membrane separation unit process using the two-stage separation membrane package can be performed by the following method.

First, the coke oven gas (COG) from which tar, oil, moisture, hydrogen sulfide and dust have been removed in the preprocessing unit (100) is compressed to a pressure of 5 bar to 15 bar by the compressor (210) of the membrane separation unit (200), and then can be introduced into the first separation membrane package (221).

Hydrogen and some carbon dioxide in the gas stream introduced into the first separation membrane package (221) can be transmitted to the permeation side by a polymer separation membrane module having high hydrogen selectivity included in the first separation membrane package (221), and carbon monoxide, nitrogen, methane, and light hydrocarbon gas can be discharged to the outside through the residual side outlet.

Thereafter, the gas stream separated through the permeation side of the first separation membrane package (221) can be introduced into the second separation membrane package (222).

Among the gas stream components introduced into the second separation membrane package (222), the gas components that have not permeated are discharged to the residual side outlet and can be re-supplied to the first separation membrane package (221), and the gas stream discharged to the permeation side of the second separation membrane package (222) can be supplied to the first adsorption unit (300). In this case, the residual side gas of the second membrane package is re-supplied to the second membrane package, so that the recovery rate of hydrogen recovered from the membrane separation unit (200) can be increased to 95% or more.

Figure 3:
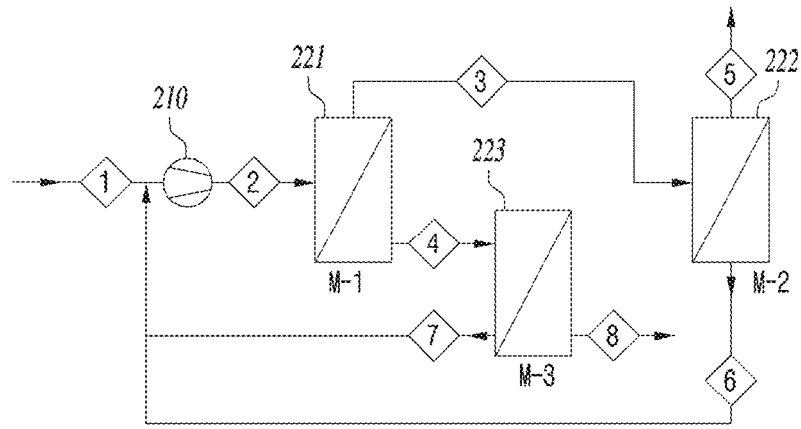
FIG. 3 is a process flow diagram of a three-stage membrane separation unit according to an embodiment of the present invention.

FIG. 3 is a process flow diagram of a membrane separation unit according to an embodiment of the present invention, showing a process flow diagram of a membrane separation unit consisting of one compressor and three separation membrane packages connected in series or parallel.

Referring to FIG. 3, the permeation side of the first separation membrane package (221) is connected to the second separation membrane package (222), and the permeation side of the second separation membrane package (222) is connected to the first adsorption unit (300) to supply a hydrogen-enriched gas stream to the first adsorption unit (300), and the residual side of the second separation membrane package (222) can be connected to a front end of the compressor (210) to have a circulation structure in which the residual gas stream of the second separation membrane package (222) is re-supplied co the first separation membrane package (221). In addition, the residual side of the first separation membrane package (221) is connected to the third separation membrane package (223), and the permeation side of the third separation membrane package (223) is connected to a front end of the compressor (210) to have a circulation structure in which the permeation side gas stream of the third separation membrane package (223) is re-supplied to the first separation membrane package (221). In this case, the compressor (210) can be located only at a front end of the first separation membrane package (221).

The membrane separation unit process using the three-stage separation membrane package can be performed by the following method.

First, the coke oven gas (COG) from which tar, oil, moisture, hydrogen sulfide and dust have been removed in the preprocessing unit (100) is compressed to a pressure of 5 bar to 15 bar by the compressor (210) of the membrane separation unit (200), and then can be introduced into the residual side inlet of the first separation membrane package (221).

Thereafter, the gas stream separated from the permeation side of the first separation membrane package (221) flows into the second separation membrane package (222), the gas stream separated from the permeation side of the second separation membrane package (222) can be supplied to the first adsorption unit (300), and the gas stream separated from the residual side can be re-supplied to the first separation membrane package (221).

In addition, the gas stream separated from the residual side of the first separation membrane package (221) flows into the third separation membrane package (223), the gas stream separated from the residual side of the third separator package (223) is discharged through an outlet, and the gas stream separated from the permeation side can be re-supplied to the first separation membrane package (221).

Figure 4:
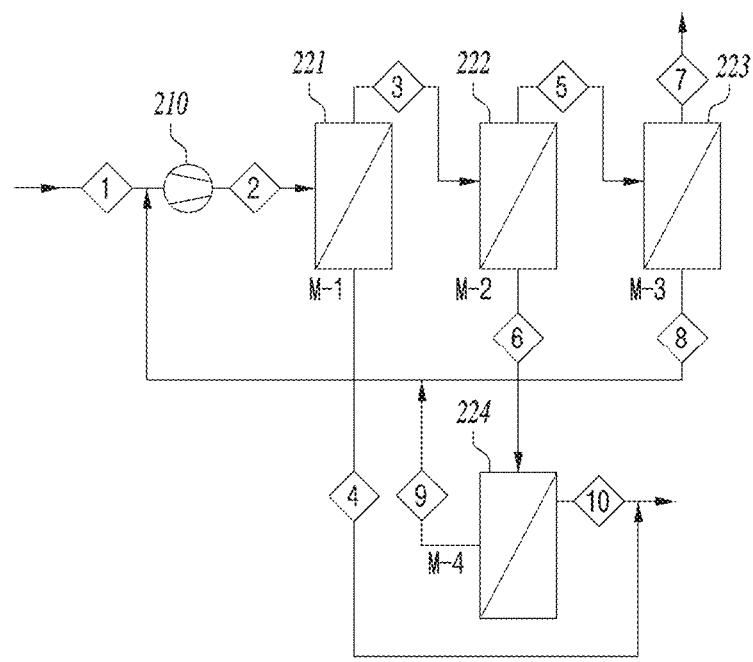
FIG. 4 is a process flow diagram of a four-stage membrane separation unit according to an embodiment of the present invention.

FIG. 4 is a process flow diagram of a membrane separation unit according to an embodiment of the present invention, showing a process flow diagram of a membrane separation unit consisting of one compressor and four separation membrane packages connected in series or parallel.

Referring to FIG. 4, the permeation side of the first separation membrane package (221) is connected to the second separation membrane package (222), and the permeation side of the third separation membrane package (223) is connected to the first adsorption unit (300) to supply a hydrogen-enriched gas stream to the first adsorption unit (300), and the residual side of the second separation membrane package (222) can be connected to a front end of the compressor (210) to have a circulation structure in which the residual gas stream of the third separation membrane package (223) is re-supplied to the first separation membrane package (221). In addition, the residual side of the second separation membrane package (222) is connected to the fourth separation membrane package (224), and the permeation side of the fourth separation membrane package (224) is connected to a front end of the compressor (210) to have a circulation structure in which the permeation side gas stream of the fourth separation membrane package (224) is re-supplied to the first separation membrane package (221). In this case, the compressor (210) can be located only at a front end of the first separation membrane package (221).

The membrane separation unit process using the four-stage separation membrane package can be performed by the following method.

First, the coke oven gas (COG) from which tar, oil, moisture, hydrogen sulfide and dust have been removed in the preprocessing unit (100) is compressed to a pressure of 5 bar to 15 bar by the compressor (210) of the membrane separation unit (200), and then can be introduced into the residual side inlet of the first separation membrane package (221).

Thereafter, the gas stream separated from the permeation side of the first separation membrane package (221) flows into the second, separation membrane package (222), the gas stream separated from the permeation side of the second separation membrane package (222) flows into the third separation membrane package (223), the gas stream separated from the permeation side of the third separation membrane package (223) can be supplied to the first adsorption unit (300), and the gas stream separated from the residual side can be re-supplied to the first separation membrane package (221).

In addition, the gas stream separated from the residual side of the second separation membrane package (222) flows into the fourth separation membrane package (224), the gas stream separated from the residual side of the fourth separator package (224) is discharged through an outlet, and the gas stream separated from the permeation side can be re-supplied to the first separation membrane package (221).

The membrane separation unit (200) can more economically recover hydrogen contained in coke oven gas (COG) with a high recovery rate of 95% or more through the circulation structure using a single compressor as described above.

At this time, in order to increase the hydrogen selectivity of the separation membrane package, the polymer separation membrane module (220) included in the separation membrane package can be composed of at least one polymer separation membrane selected from the group consisting of polysulfone, polyimide and polybenzimidazole with high hydrogen selectivity.

In addition, the polysulfone, polyimide and polybenzimidazole-based polymer separation membrane is a glassy polymer membrane, and as the temperature increases, the solubility of $CO_2$ decreases whereas the dispersion coefficient of hydrogen having a small molecular size increases, thereby increasing the selectivity. Therefore, in order to increase the hydrogen selectivity of the polymer membrane to carbon monoxide, methane and nitrogen and further lower the carbon dioxide selectivity, the temperature of the gas stream flowing into the first separation membrane package (221) and the second separation membrane package (222) can preferably be maintained at a temperature of 0° C. to 100° C., more preferably 20° C. to 50° C.

Meanwhile, the membrane separation unit (200) can further include a cooler disposed at a front end of the polymer separation membrane module (220), preferably inside the compressor (210) or at a rear end of the compressor (210).

The cooler can prevent damage to the polymer separation membrane module (220) by maintaining the temperature of the gas stream flowing into the polymer separation membrane module (220), that is, the temperature of the residual side at 0° C. to 100° C., and can increase the membrane separation efficiency.

That is, heat is generated during the operation of the compressor (210) and the compression process to increase the temperature of the gas stream compressed by the compressor (210). Accordingly, by disposing the cooler inside or at a rear end of the compressor (210), the temperature of the gas stream flowing into the polymer separation membrane module (220), that is, the temperature of the residual side gas stream can be maintained at 0° C. to 100° C.

If the temperature of the gas stream delivered to the polymer separation membrane module (220) is less than 0° C., the separation membrane may be damaged due to moisture freezing in the polymer separation membrane, and if the temperature exceeds 100° C., the separation membrane may be damaged due to membrane degradation.

The hydrogen-enriched gas stream generated by the membrane separation unit (200) preferably has a concentration of 95 to 99 vol % and a recovery rate of 90 to 95% or more.

In the first adsorption unit, high-purity hydrogen of 99% or more, preferably 99.9% or more, and more preferably 99.99% or more, is recovered at a high recovery rate of 85% to 90% using a small number of adsorption processes, preferably a 4-bed or less adsorption process, more preferably a 2-bed or less adsorption process, and even more preferably a 1-bed adsorption process.

If the hydrogen recovery rate of the hydrogen-enriched gas stream is less than 90%, the final recovery rate may be reduced to less than 85% due to the amount of gas loss lost in the process of desorbing the gas adsorbed in the first adsorption unit (300) performed after the membrane separation unit (200). In addition, if the hydrogen concentration of the hydrogen-enriched gas stream is less than 95%, a more complicated adsorption process is required to produce hydrogen with a high purity of 99% or more, which may reduce economic efficiency.

Meanwhile, the system (1) includes a first adsorption unit (300) that separates and recovers hydrogen by contacting the hydrogen-enriched gas stream with a first adsorbent.

The first adsorption unit (300) is a device for separating and recovering high-purity hydrogen of 99% or more, preferably 99.9% or more, more preferably 99.99% or more by removing carbon dioxide and trace amounts of carbon monoxide, nitrogen, methane, and light hydrocarbons that have not been removed by the membrane separation unit (200).

The first adsorption unit (300) can be operated by a pressure swing adsorption (PSA) method using an adsorption tower filled with one or more first adsorbents in a single layer or in multiple layers. In this case, the adsorption tower can be 1 to 4-beds, or 1 to 6-beds.

Since the system (1) delivers a gas stream containing less than 5% impurity gas excluding hydrogen to the first adsorption unit (300), the first adsorption unit (300) can be preferably operated by a 4-bed or less pressure swing adsorption (PSA) method, and more preferably operated by a 2-bed or less pressure swing adsorption (PSA) method. Therefore, there is an advantage in that energy economy can be significantly improved compared to the conventional pressure swing adsorption (PSA) process.

In addition, since the impurity gas other than hydrogen delivered to the first adsorption unit (300) is remarkably low (less than 5%), there is an advantage that the first adsorbent used to remove it can be used for a longer time than in the conventional general pressure swing adsorption (PSA) process.

On the other hand, the first adsorbent filled in the adsorption tower of the first adsorption unit (300) is for separating and removing a gas mixture containing carbon dioxide, nitrogen, carbon monoxide, methane, carbon monoxide and hydrocarbon, and can include at least two selected from the group consisting of synthetic or natural activated carbon, impregnated activated carbon, zeolite, carbon molecular sieve, alumina and silica gel.

For example, the first adsorbent can be at least one selected from the group consisting of carbon molecular sieve activated carbon (CMS 5A), Ag-doped impregnated activated carbon, zeolite 13X, zeolite 5A, CuCl and Lix-doped zeolite LiX, and may be used as the adsorbent by appropriately mixing them.

The size of the adsorption bed filled with the first adsorbent in the adsorption tower is preferably in the range of 200 cm to 2000 cm in diameter, but not always limited thereto. The size of the adsorption bed can be optimally determined in consideration of the adsorption power of the first adsorbent and the pressure loss in the adsorption bed.

The adsorption tower can use one adsorption tower for adsorbing carbon monoxide, but preferably at least four adsorption towers, for example six adsorption towers can be connected in series and/or in parallel to continue the adsorption process while the carbon monoxide adsorbed to the one adsorption tower is desorbed. Meanwhile, the adsorption tower can further include a jacket for supplying cooling water to remove heat generated by the adsorption reaction.

The system for separating and recovering hydrogen from coke oven gas (COG) in steel industry according to one aspect of the present invention can desorb and recover the carbon monoxide adsorbed by the first adsorption unit (300).

At this time, the desorption of carbon monoxide can be achieved by decompressing or heating the adsorption tower of the first adsorption unit (300), and a heating means or decompression means can be used for heating or depressurizing.

The desorption can be performed at a temperature of 50° C. or higher and a pressure of 0.15 bar to 1 bar, preferably at a temperature of 60° C. to 100° C. and a pressure of 0.1 bar to 1 bar.

In addition, the system for separating and recovering hydrogen from coke oven gas (COG) in steel industry can further include a second adsorption unit performed by TSA (thermal swing adsorption) or VPSA (thermal swing adsorption) at a rear end of the first adsorption unit (300) performed by PSA (pressure swing adsorption), thereby further increasing the hydrogen separation efficiency.

The second adsorption unit includes an adsorption tower containing a second adsorbent for removing carbon dioxide, carbon monoxide, hydrocarbons, nitrogen and methane, and can completely remove trace amounts of carbon dioxide, carbon monoxide, hydrocarbon, and the like that have not been completely removed in the separation membrane process or PSA process.

In this case, the second adsorbent can be the same as or different from the first adsorbent.

In addition, the second adsorption unit can preferably be used by connecting two or more adsorption towers in series and/or in parallel so that the adsorption process can be continued without stopping while desorbing impurities such as carbon dioxide adsorbed in the adsorption tower at a front end under high temperature and atmospheric pressure or reduced pressure.

On the other hand, the system (1) can have a circulation structure in which the gas stream discharged from the first adsorption unit (300) is supplied to the membrane separation unit (200), preferably, to a front end of the compressor (210) of the membrane separation unit (200).

The system (1) for separating and recovering hydrogen from coke oven gas (COG) in steel industry according to one aspect of the present invention separates hydrogen at a high concentration of 95 volume % to 99 volume % or more with a recovery rate of 90% to 95% or more from coke oven gas (COG) by a membrane separation method in the membrane separation unit (200). Thereafter, less than 5% of the impurity gas that has not been removed is removed in the first adsorption unit (300). In this way, it is possible to recover high-purity hydrogen of 99% or more, preferably 99.9% or more, more preferably 99.99% or more with a high recovery rate of 85% to 90% or more.

In addition, the said system (1) has an advantage of recovering high purity hydrogen from coke oven gas (COG) with high economic efficiency by minimizing the adsorption process, which requires a lot of capital and energy costs, and minimizing the use of compressors.

The system for separating and recovering hydrogen from coke oven gas (COG) in steel industry according to one embodiment of the present invention comprises the following units, and can separate and recover hydrogen at a concentration of 99.9 volume % or more with a recovery rate of 95% or more:

- a preprocessing unit for removing impurities including tar, moisture, oil, hydrogen sulfide and dust from coke oven gas (COG) containing hydrogen, methane, carbon monoxide, carbon dioxide, nitrogen, light hydrocarbons and impurities such as tar, moisture, oil, hydrogen sulfide and dust;
- a membrane separation unit comprising three separation membrane packages in which at least two separation membrane packages that selectively permeate hydrogen are connected in series that produces a hydrogen-enriched gas stream at a concentration of at least 95 volume % by recovering hydrogen from coke oven gas (COG) with a recovery rate of 90% or more through membrane separation of the coke oven gas (COG) treated in the preprocessing unit; and
- a first adsorption unit for separating and recovering hydrogen from the coke oven gas (COG) by contacting the hydrogen-enriched gas stream with a first adsorbent.

In another aspect of the present invention, the present invention provides a method for separating and recovering hydrogen at a concentration of 99.9% by volume or more from coke oven gas (COG) in steel industry with a recovery rate of 95% or more, comprising the following steps:

- a step of preprocessing to remove impurities including tar, moisture, oil, hydrogen sulfide and dust from coke oven gas (COG) containing hydrogen, methane, carbon monoxide, carbon dioxide, nitrogen, light hydrocarbons and impurities such as tar, moisture, oil, hydrogen sulfide and dust;
- a step of membrane separation to produce a hydrogen-enriched gas stream at a concentration of at least 95 volume % by recovering hydrogen from the coke oven gas (COG) with a recovery rate of 90% or more through membrane separation of the coke oven gas (COG) treated in the preprocessing unit in the membrane separation unit comprising a plurality of separation membrane packages in which at least two separation membrane packages that selectively permeate hydrogen are connected in series, and a single compressor connected to the separation membrane package; and
- a step of first adsorption to separate and recover hydrogen from the coke oven gas (COG) by contacting the hydrogen-enriched gas stream with a first adsorbent.

The method for separating and recovering hydrogen from coke oven gas (COG) in steel industry can be performed using the above-described system for separating and recovering hydrogen from coke oven gas (COG) in steel industry, and thus some or all of the above-described contents for the system for separating and recovering hydrogen from coke oven gas (COG) in steel industry can be included in this method.

Hereinafter, the method for separating and recovering hydrogen from coke oven gas (COG) in steel industry provided in another aspect of the present invention will be described in detail step by step.

First, the method for separating and recovering hydrogen from coke oven gas (COG) in steel industry provided in another aspect of the present invention includes a step of preprocessing to remove tar, moisture, oil, hydrogen sulfide and dust from coke oven gas (COG).

The step of preprocessing is a step of removing impurities such as tar, oil, moisture, hydrogen sulfide and dust contained in coke oven gas (COG), and can be performed using at least one of a condensing device, a filtering device and a desulfurization device, preferably can be performed using all of them.

More specifically, the step of preprocessing comprises the following steps:

- a condensation step of condensing and removing moisture, oil, and tar in a droplet state by cooling coke oven gas (COG) using a condensing device;
- a filtration step of removing dust contained in coke oven gas (COG) using a filtering device; and
- a desulfurization step of removing hydrogen sulfide contained in coke oven gas (COG) using a desulfurization device.

At this time, the condensing device (110) can cool the coke oven gas (COG) with a refrigerant having a temperature between 0° C. and 20° C. in order to effectively liquefy moisture, oil, and tar to discharge to the lower part of the device. Part of the dust contained in the coke oven gas (COG) can also be partially removed by being collected in the liquefied impurities.

In addition, as the filtering device, a bag filter, a cartridge type filter, or an electric dust collector can be used to collect and remove residual dust contained in coke oven gas (COG), that is, remaining particulate materials.

For the desulfurization device, a wet method for removing hydrogen sulfide by absorbing it in a highly soluble solvent such as amine, or a dry method for removing hydrogen sulfide by adsorbing it to a first adsorbent can be used, but preferably a dry method having excellent hydrogen sulfide removal effect can be used. As the first adsorbent used at this time, a first adsorbent in which iron oxide ($Fe_2O_3$) or zinc oxide (ZnO) is supported on various supports such as zeolite, activated carbon and wood chips can be used. The desulfurization device (140) may be an adsorption tower, in which the first adsorbent is disposed, and can remove hydrogen sulfide contained in coke oven gas (COG) through a repeated cycle process of adsorption and desorption of the adsorption tower.

Next, the method for separating and recovering hydrogen from coke oven gas (COG) in steel industry provided in another aspect of the present invention includes a step of membrane separation to produce a hydrogen-enriched gas stream by membrane separation of the coke oven gas (COG) treated in the step of preprocessing using a polymer separation membrane module.

The step of membrane separation is a step of generating a hydrogen-enriched gas stream from coke oven gas (COG) from which tar, moisture, oil, hydrogen sulfide, and dust have been removed. This step can be a step of generating a hydrogen-enriched gas stream in which at least about 95% of the total volume, preferably at least 99% of the total volume is hydrogen.

The membrane separation step can be a step of concentrating hydrogen by a membrane separation method in which hydrogen is separated by a pressure difference between the residual side and the permeation side of the polymer membrane module.

The polymer separation membrane module can include a polymer separation membrane that selectively permeates hydrogen or selectively retains hydrogen from a mixed gas containing carbon monoxide, carbon dioxide, nitrogen, methane and light hydrocarbon gas, but can preferably include a polymer separation membrane that selectively permeates hydrogen in consideration of ease of use and effectiveness of hydrogen separation.

Accordingly, the polymer separation membrane is a separation membrane having excellent hydrogen selectivity, and can be at least one selected from the group consisting of polysulfone, polyimide, and polybenzimidazole.

The polysulfone, polyimide and polybenzimidazole-based polymer separation membrane has a hydrogen selectivity of 20 or more, preferably 20 to 200, and removes carbon monoxide, nitrogen, methane and light hydrocarbons excluding carbon dioxide from coke oven gas (COG) to effectively permeate and separate hydrogen.

Accordingly, in the step of membrane separation, at least one selected from the group consisting of polysulfone, polyimide and polybenzimidazole is used as the polymer separation membrane, and the temperature of the gas stream delivered to the polymer membrane is preferably maintained at a temperature of 0° C. to 100° C., more preferably 20° C. to 50° C., thereby the hydrogen selectivity can be further increased, and the hydrogen separation and recovery efficiency can be also increased.

On the other hand, it is possible to increase the membrane separation efficiency by increasing the pressure of the gas stream flowing into the polymer separation membrane module, that is, the pressure on the residual side.

To this end, the membrane separation unit is characterized in that it includes a single compressor, that is, one compressor (210).

The compressor can be located at a front end of the separation membrane package disposed at a frontmost end among the plurality of separation membrane packages, that is, between the preprocessing unit and the frontmost separation membrane package.

The compressor can increase the membrane separation efficiency by increasing the pressure of the gas stream flowing into the frontmost separation membrane package.

In addition, the temperature of the gas stream flowing into the polymer separation membrane module, that is, the residual side temperature, is maintained at 0° C. to 100° C., thereby preventing damage to the polymer separation membrane module and increasing the membrane separation efficiency.

To this end, a cooler can be disposed at a front end of the polymer separation membrane module, and the cooler can be preferably disposed inside the compressor or at a rear end of the compressor.

The hydrogen-enriched gas stream generated by the membrane separation unit preferably has a concentration of 95 to 99 vol % and a recovery rate of 90 to 95% or more.

In the first adsorption unit, high-purity hydrogen of 99% or more, preferably 99.9% or more, and more preferably 99.99% or more, is recovered at a high recovery rate of 85% to 90% using a small number of adsorption processes, preferably a 4-bed or less adsorption process, more preferably a 2-bed or less adsorption process, and even more preferably a 1-bed adsorption process.

If the hydrogen recovery rate of the hydrogen-enriched gas stream is less than 90%, the final recovery rate may be reduced to less than 85% due to the amount of gas loss lost in the process of desorbing the gas adsorbed in the step of first adsorption performed after the step of membrane separation. In addition, if the hydrogen concentration of the hydrogen-enriched gas stream is less than 95%, a more complicated adsorption process is required to produce hydrogen with a high purity of 99% or more, which may reduce economic efficiency.

To this end, the step of membrane separation can be performed using a multi-stage separation membrane package including a plurality of separation membrane packages containing at least one polymer separation membrane module in which at least two separation membrane packages among the plurality of separation membrane packages are connected in series.

In addition, the membrane separation package can have a circulation structure for re-supplying the gas stream discharged from a residual outlet of the separation membrane package located at a rear end of the separation membrane package to a residual inlet of the separation membrane package located at a front end.

In the method for separating and recovering hydrogen from coke oven gas (COG) in steel industry according to another aspect of the present invention, the purity and recovery rate of hydrogen separated and recovered from coke oven gas (COG) can be increased to 95% or more by using a multi-stage membrane package structure in the step of membrane separation.

The multi-stage separation membrane package structure can be a two-stage separation membrane package structure in which two separation membrane packages are connected in series, or can be a three-stage separation membrane package structure including two separation membrane packages connected in series, but is not limited thereto, and the multi-stage separation membrane package structure can include various structures in which two or more separation membrane packages are connected in series and/or in parallel.

Next, the method for separating and recovering hydrogen from coke oven gas (COG) in steel industry provided in another aspect of the present invention includes a step of first adsorption to separate and recover hydrogen by contacting the hydrogen-enriched gas stream with a first adsorbent.

The step of first adsorption can be a step of separating and recovering high-purity hydrogen of 99% or more, preferably 99.9% or more, and more preferably 99.99% or more by removing carbon dioxide and trace amounts of carbon monoxide, nitrogen, methane, and light hydrocarbons that have not been removed in the step of membrane separation.

The step of first adsorption can be performed by a pressure swing adsorption (PSA) method using an adsorption tower filled with one or more first adsorbents in a single layer or in multiple layers.

In addition, since the gas stream delivered to the step of first adsorption contains less than 5% of impurity gas excluding hydrogen, the step of first adsorption can be preferably performed by a 4-bed or less pressure swing adsorption (PSA) method, and more preferably performed by a 2-bed or less pressure swing adsorption (PSA) method. Therefore, it is advantageous in that energy economy can be significantly improved compared to the conventional pressure swing adsorption (PSA) process, and the first adsorbent can be used for a longer time than in the conventional pressure swing adsorption (PSA) process.

The first adsorbent filled in the adsorption tower in the step of first adsorption is for separating and removing a gas mixture containing carbon dioxide, nitrogen, carbon monoxide, methane, carbon monoxide and hydrocarbon, and can include at least two selected from the group consisting of synthetic or natural activated carbon, impregnated activated carbon, zeolite, carbon molecular sieve, alumina and silica gel.

For example, the first adsorbent can be at least one selected from the group consisting of carbon molecular sieve activated carbon (CMS 5A), Ag-doped impregnated activated carbon, zeolite 13X, zeolite 5A, CuCl and Lix-doped zeolite LiX, and may be used as the adsorbent by appropriately mixing them.

The size of the adsorption bed filled with the first adsorbent in the adsorption tower is preferably in the range of 200 cm to 2000 cm in diameter, but not always limited thereto. The size of the adsorption bed can be optimally determined in consideration of the adsorption power of the first adsorbent and the pressure loss in the adsorption bed.

The adsorption tower can use one adsorption tower for adsorbing carbon monoxide, but preferably at least four adsorption towers, for example six adsorption towers can be connected in series and/or in parallel to continue the adsorption process while the carbon monoxide adsorbed to the one adsorption tower is desorbed. Meanwhile, the adsorption tower can further include a jacket for supplying cooling water to remove heat generated by the adsorption reaction.

The method for separating and recovering hydrogen from coke oven gas (COG) in steel industry can further include a carbon monoxide recovery step of desorbing and recovering carbon monoxide adsorbed in the step of first adsorption, and the carbon monoxide recovery step can include a desorption step of desorbing carbon monoxide adsorbed in the step of first adsorption.

The desorption step can be performed by decompressing or heating the adsorption tower, and a heating means or decompression means can be used for heating or depressurizing.

The desorption step can be performed at a temperature of 50° C. or higher and a pressure of 0.15 bar to 1 bar, preferably at a temperature of 60° C. to 100° C. and a pressure of 0.1 bar to 1 bar.

In addition, the method for separating and recovering hydrogen from coke oven gas (COG) in steel industry can further include a step of second adsorption performed by TSA (thermal swing adsorption) or VPSA (thermal swing adsorption) at a rear end of the first adsorption unit (300) performed by PSA (pressure swing adsorption), thereby further increasing the hydrogen separation efficiency. The method for separating and recovering hydrogen from coke oven gas (COG) in steel industry can further include a step of second adsorption capable of completely removing trace amounts of carbon dioxide, carbon monoxide, hydrocarbons, and the like that have not been completely removed in the separation membrane process or PSA process by installing an adsorption tower filled with a second adsorbent for removing carbon dioxide, carbon monoxide, hydrocarbons, nitrogen, and methane after the step of first adsorption performed by pressure circulation adsorption (PSA) to increase the separation efficiency of the adsorption tower. The step of second adsorption can be performed by thermal swing adsorption (TSA) or vapor pressure swing adsorption (VPSA).

In this case, the second adsorbent can be the same as or different from the first adsorbent.

The step of second adsorption can preferably be performed by connecting two or more adsorption towers in series and/or in parallel so that the adsorption process can be continued without stopping while desorbing impurities such as carbon dioxide adsorbed in the adsorption tower at a front end under high temperature and atmospheric pressure or reduced pressure.

In another aspect of the present invention, the present invention provides a method for concentrating hydrogen from coke oven gas (COG) in steel industry that separates and recovers hydrogen at a concentration of 99.9% by volume or more with a recovery rate of 95% or more, comprising the following steps:

a step of preprocessing to remove impurities including tar, moisture, oil, hydrogen sulfide and dust from coke oven gas (COG) containing hydrogen, methane, carbon monoxide, carbon dioxide, nitrogen, light hydrocarbons and impurities such as tar, moisture, oil, hydrogen sulfide and dust;

a step of membrane separation to produce a hydrogen-enriched gas stream at a concentration of at least 95 volume % by recovering hydrogen from the coke oven gas (COG) with a recovery rate of 90% or more through membrane separation of the coke oven gas (COG) treated in the preprocessing unit in the membrane separation unit comprising a plurality of separation membrane packages in which at least two separation membrane packages that selectively permeate hydrogen are connected in series, and a single compressor connected to the separation membrane package; and a step of first adsorption to separate and recover hydrogen from the coke oven gas (COG) by contacting the hydrogen-enriched gas stream with a first adsorbent.

The method for concentrating hydrogen from coke oven gas (COG) in steel industry can include some or all of the contents of the above-described method for separating and recovering hydrogen from coke oven gas (COG) in the steel industry.

The method for concentrating hydrogen can concentrate hydrogen at a concentration of 95% or more, preferably 99% or more through a membrane separation process, and thus can concentrate hydrogen at a concentration of 99% or more, preferably 99.9% or more, more preferably 99.99% or more from coke oven gas (COG) in the step of first adsorption using a 4-bed or less adsorption process, preferably a 2-bed or less adsorption process.

Hereinafter, the present invention will be described in detail by the following examples. However, the scope of the present invention is not limited to the following examples.

EXAMPLE 1

Step 1: In order to remove tar, oil, moisture, hydrogen sulfide, and dust by pre-treating coke oven gas (COG) by-produced in a steel mill, a preprocessing device, in which a condensing device, a filtering device, and a desulfurization device were sequentially connected, was constructed and installed, and coke oven gas (COG) was pretreated while supplying at a flow rate of 1.1 Nm$^3$/hr. The concentration of the pretreated gas was measured and shown in Table 2 below.

TABLE 1

| Composition (vol %) | | | | | | |
|---|---|---|---|---|---|---|
| $H_2$ | CO | $CO_2$ | $CH_4$ | $C_mH_n$ | $N_2$ | $O_2$ |
| 59.3 | 8.0 | 2.1 | 23.3 | 2.5 | 4.9 | 0.2 |

$C_mH_n$: $C_2$ or more hydrocarbons

At this time, the condenser was shell and tube type, and four 1-inch stainless 304 pipes with a schedule number of 10 and a length of 60 cm were installed as inner tubes, and filled with stainless steel metal fillings to promote heat transfer and liquefaction rate of impurities. As the filtering device, a polyester bag filter type commercial product with a diameter of 30 cm and a length of 80 cm was purchased and used. In addition, as the desulfurization device for removing hydrogen sulfide contained in coke oven gas (COG) at a concentration of about 1000 ppm, an adsorption tower was constructed with an 8-inch pipe made of stainless 316 with a schedule number of 10 and a length of 100 cm, and a first adsorbent on which oxide was supported was charged and installed. As a result of analyzing the COG that passed through the preprocessing unit, the concentrations of tar, oil and hydrogen sulfide were less than 0.5 ppm, respectively.

Step 2: A membrane separation-adsorption hybrid process comprising a membrane separation unit consisting of a two-stage separation membrane package shown in FIG. 1 and a first adsorption unit consisting of a 1-bed adsorption tower was constructed and installed, and hydrogen was recovered while supplying the coke oven gas (COG) pretreated in step 1 at a flow rate of 605 Nm$^3$/hr.

At this time, a diaphragm type compressor was used as the compressor used in the two-stage separation membrane package. In addition, as the polymer separation membrane, a plurality of hollow fiber-type polysulfone membrane modules having unit membrane areas of 0.1 m$^2$ and 1 m$^2$ were installed in parallel, so that the membrane areas of the first and second separation membrane packages were as shown in Table 3 below. At this time, the gas permeability of the polysulfone membrane is shown in Table 2 below.

The gas stream pressure in the membrane separation unit is shown in Table 3 below, and the temperatures of the first and second separation membrane packages were maintained at 25° C.

TABLE 2

| Composition (vol %) | | | | | | |
|---|---|---|---|---|---|---|
| $H_2$ | CO | $CO_2$ | $CH_4$ | $C_mH_n$ | $N_2$ | $O_2$ |
| 216.2 | 5.7 | 92.4 | 3.5 | 1.7 | 3.0 | 16.0 |

In addition, the adsorption tower of the first adsorption unit (300) is filled with activated carbon, CuCl-doped impregnated activated carbon, and zeolite LiX first adsorbent at a ratio of 20 to 49%, respectively, in a total of 100% in 4 stages, or filled with carbon molecular sieve activated carbon, AgNO$_3$-doped impregnated activated carbon, and zeolite 5A first adsorbent at a ratio of 25 to 35% in a total amount of 100%, respectively, in a total of 100% in 6 stages.

EXAMPLE 2

The same process as in Example 1 was performed except that the membrane separation unit consisting of the three-stage separation membrane package of FIG. 3 was used instead of the membrane separation unit used in Example 1.

At this time, as the polymer separation membrane, a plurality of hollow fiber-type polysulfone membrane modules having unit membrane areas of 0.1 m$^2$ and 1 m$^2$ were installed in parallel, so that the membrane areas of the first to third separation membrane packages were as shown in Table 4 below. The gas stream pressure in the membrane separation unit is shown in Table 4 below, and the temperatures of the first and second separation membrane packages were maintained at 25° C.

EXAMPLE 3

The same process as in Example 1 was performed except that the membrane separation unit consisting of the four-stage separation membrane package of FIG. 4 was used instead of the membrane separation unit used in Example 1.

At this time, as the polymer separation membrane, a plurality of hollow fiber-type polysulfone membrane modules having unit membrane areas of 0.1 m$^2$ and 1 m$^2$ were installed in parallel, so that the membrane areas of the first to fourth separation membrane packages were as shown in Table 5 below. The gas stream pressure in the membrane separation unit is shown in Table 5 below, and the temperatures of the first and second separation membrane packages were maintained at 25° C.

EXPERIMENTAL EXAMPLE 1

Gas components and concentrations of the gas streams transmitted from the membrane separation processes in the processes of Examples 1 and 2 were analyzed by gas chromatography, and the results are shown in Tables 3 and 4 below.

TABLE 3

| Example | Pressure (bar) Stream 2, 3 | Pressure (bar) Stream 4, 5 | Membrane area (m²) First | Membrane area (m²) Second | Membrane area (m²) Total | H₂ recovery rate (%) | H₂ purity (%) | Compressor power (kWh) | R/F (%) |
|---|---|---|---|---|---|---|---|---|---|
| 1-1 | 10 | 1 | 99 | 400 | 499 | 96.4 | 97.08 | 115.4 | 76.7 |
| 1-2 | 10 | 1 | 127 | 270 | 397 | 96.07 | 97.04 | 86.9 | 33.3 |

TABLE 4

| Example | Pressure (bar) Stream 2, 3 | Pressure (bar) Stream 4 | Pressure (bar) Stream 6, 8 | Membrane area (m²) First | Membrane area (m²) Second | Membrane area (m²) Third | Membrane area (m²) Total | H₂ recovery rate (%) | H₂ purity (%) | Compressor power (kWh) | R/F (%) |
|---|---|---|---|---|---|---|---|---|---|---|---|
| 2-1 | 10 | 2.8 | 1 | 300 | 240 | 410 | 950 | 97.28 | 98.08 | 81.6 | 28.7 |
| 2-2 | 10 | 2.7 | 1 | 300 | 230 | 440 | 970 | 97.22 | 98.04 | 80.5 | 27.1 |

TABLE 5

| Example | Pressure (bar) Stream 2, 3, 5 | Pressure (bar) Stream 6 | Pressure (bar) Stream 4, 8, 10 | Membrane area (m²) First | Membrane area (m²) Second | Membrane area (m²) Third | Membrane area (m²) Fourth | Membrane area (m²) Total | H₂ recovery rate (%) | H₂ purity (%) | Compressor power (kWh) | R/F (%) |
|---|---|---|---|---|---|---|---|---|---|---|---|---|
| 3-1 | 10 | 2.8 | 1 | 20 | 290 | 230 | 350 | 890 | 98.31 | 99.13 | 81.6 | 26.5 |
| 3-2 | 10 | 2.8 | 1 | 15 | 290 | 230 | 330 | 875 | 98.37 | 98.81 | 81.8 | 26.8 |

Table 3 shows the results of Example 1 in which a two-stage process was performed. As shown in Table 3, it was confirmed that hydrogen concentrated to a high purity of 97% or more was recovered with a recovery rate of 96% or more by controlling the membrane area.

In addition, Table 4 shows the results of Example 2 in which a three-stage process was performed. As shown in Table 4, it was confirmed that hydrogen concentrated to a high purity of 98% or more was recovered with a recovery rate of 97% or more.

In addition, Table 5 shows the results of Example 3 in which a four-stage process was performed. As shown in Table 5, it was confirmed that hydrogen concentrated to a high purity of 98% or more was recovered with a recovery rate of 99% or more by controlling the membrane area.

On the other hand, in the case of the three-stage process, the recirculation rate (R/F) is 28% to 30%, which is significantly lower than that of the two-stage process, thereby significantly reducing the required compressor capacity. Therefore, there is an advantage of high economic efficiency in that compression energy cost and overall plant cost can be reduced.

In addition, it was confirmed that the concentration of hydrogen finally recovered after the 4-stage PSA adsorption process in Examples 1 to 3 was 99.995%, and the recovery rate was 85% or more. Except for hydrogen, the concentrations of carbon monoxide, carbon dioxide, nitrogen, methane, and light hydrocarbon gas were found to be less than 1 ppm, respectively.

In addition, it was confirmed that the concentration of hydrogen finally recovered after the 6-stage PSA adsorption process in Examples 1 to 3 was 99.999%, and the recovery rate was 90% or more. Except for hydrogen, the concentrations of carbon monoxide, carbon dioxide, nitrogen, methane, and light hydrocarbon gas were found to be less than 1 ppm, respectively.

What is claimed is:

1. A system for separating and recovering hydrogen from coke oven gas (COG) in steel industry at a concentration of 99.9 volume % or more with a recovery rate of 95% or more, comprising the following units:
   a preprocessing unit for removing impurities including tar, moisture, oil, hydrogen sulfide and dust from coke oven gas (COG) containing hydrogen, methane, carbon monoxide, carbon dioxide, nitrogen, light hydrocarbons and impurities comprising tar, moisture, oil, hydrogen sulfide and dust;
   a membrane separation unit comprising a plurality of separation membrane packages in which at least two separation membrane packages that selectively permeate hydrogen are connected in series, and a single compressor connected to any one of the plurality of separation membrane packages that produces a hydrogen-enriched gas stream at a concentration of at least 95 volume % by recovering hydrogen from the coke oven gas (COG) with a recovery rate of 90% or more through membrane separation of the coke oven gas (COG) treated in the preprocessing unit; and a first adsorption unit for separating and recovering hydrogen from the coke oven gas (COG) by contacting the hydrogen-enriched gas stream with a first adsorbent,
wherein the gas stream discharged from the first adsorption unit has a circulation structure supplied to a front end of the compressor.

2. The system for separating and recovering hydrogen from coke oven gas (COG) in steel industry according to claim 1, wherein the membrane separation unit has a circulation structure for re-supplying the gas stream discharged from a residual outlet of a separation membrane package located at a rear end of the plurality of separation membrane packages to a residual inlet of a separation membrane package located at a front end.

3. The system for separating and recovering hydrogen from coke oven gas (COG) in steel industry according to claim 1, wherein the compressor compresses the gas stream delivered to the plurality of separation membrane packages to 5 bar to 15 bar.

4. The system for separating and recovering hydrogen from coke oven gas (COG) in steel industry according to claim 1, wherein each of the plurality of separation membrane packages comprises a polymer separation membrane for selectively separating hydrogen from a mixed gas including hydrogen, carbon monoxide, carbon dioxide, nitrogen, methane and light hydrocarbon gas.

5. The system for separating and recovering hydrogen from coke oven gas (COG) in steel industry according to claim 4, wherein the polymer separation membrane is composed of at least one selected from the group consisting of polysulfone, polyimide and polybenzimidazole.

6. The system for separating and recovering hydrogen from coke oven gas (COG) in steel industry according to claim 1, wherein the first adsorption unit is operated by a pressure swing adsorption (PSA) method using an adsorption tower in which a first adsorbent is filled in a single layer or multiple layers, and the first adsorbent is at least one selected from the group consisting of carbon molecular sieve activated carbon (CMS 5A), Ag-doped impregnated activated carbon, zeolite 13X, zeolite 5A, CuCl and Lix-doped zeolite LiX.

7. The system for separating and recovering hydrogen from coke oven gas (COG) in steel industry according to claim 6, wherein the system further comprises a second adsorption unit operated by a thermal swing adsorption (TSA) method or a vapor pressure swing adsorption (VPSA) method at a rear end of the first adsorption unit operated by a pressure swing adsorption (PSA) method.

8. A method for separating and recovering hydrogen from coke oven gas (COG) in steel industry at a concentration of 99.9 volume % or more with a recovery rate of 95% or more, comprising the following steps:
a step of preprocessing to remove impurities including tar, moisture, oil, hydrogen sulfide and dust from coke oven gas (COG) containing hydrogen, methane, carbon monoxide, carbon dioxide, nitrogen, light hydrocarbons and impurities comprising tar, moisture, oil, hydrogen sulfide and dust;
a step of membrane separation to produce a hydrogen-enriched gas stream at a concentration of at least 95 volume % by recovering hydrogen from the coke oven gas (COG) with a recovery rate of 90% or more through membrane separation of the coke oven gas (COG) treated in the preprocessing unit in the membrane separation unit comprising a plurality of separation membrane packages in which at least two separation membrane packages that selectively permeate hydrogen are connected in series, and a single compressor connected to the plurality of separation membrane packages; and
a step of first adsorption to separate and recover hydrogen from the coke oven gas (COG) by contacting the hydrogen-enriched gas stream with a first adsorbent,
wherein the gas stream discharged from the step of first adsorption has a circulation structure supplied to a front end of the compressor.

9. The method for separating and recovering hydrogen from coke oven gas (COG) in steel industry according to claim 8, wherein the plurality of separation membrane packages comprises a polymer separation membrane for selectively separating hydrogen from a mixed gas including hydrogen, carbon monoxide, carbon dioxide, nitrogen, methane and light hydrocarbon gas.

10. A method for concentrating hydrogen from coke oven gas (COG) in steel industry that separates and recovers hydrogen at a concentration of 99.9 volume % or more with a recovery rate of 95% or more, comprising the following steps:
a step of preprocessing to remove impurities including tar, moisture, oil, hydrogen sulfide and dust from coke oven gas (COG) containing hydrogen, methane, carbon monoxide, carbon dioxide, nitrogen, light hydrocarbons and impurities comprising tar, moisture, oil, hydrogen sulfide and dust;
a step of membrane separation to produce a hydrogen-enriched gas stream at a concentration of at least 95 volume % by recovering hydrogen from the coke oven gas (COG) with a recovery rate of 90% or more through membrane separation of the coke oven gas (COG) treated in the preprocessing unit in the membrane separation unit comprising a plurality of separation membrane packages in which at least two separation membrane packages that selectively permeate hydrogen are connected in series, and a single compressor connected to the plurality of separation membrane packages; and
a step of first adsorption to separate and recover hydrogen from the coke oven gas (COG) by contacting the hydrogen-enriched gas stream with a first adsorbent,
wherein the gas stream discharged from the step of first adsorption has a circulation structure supplied to a front end of the compressor.

* * * * *